Figure 10:
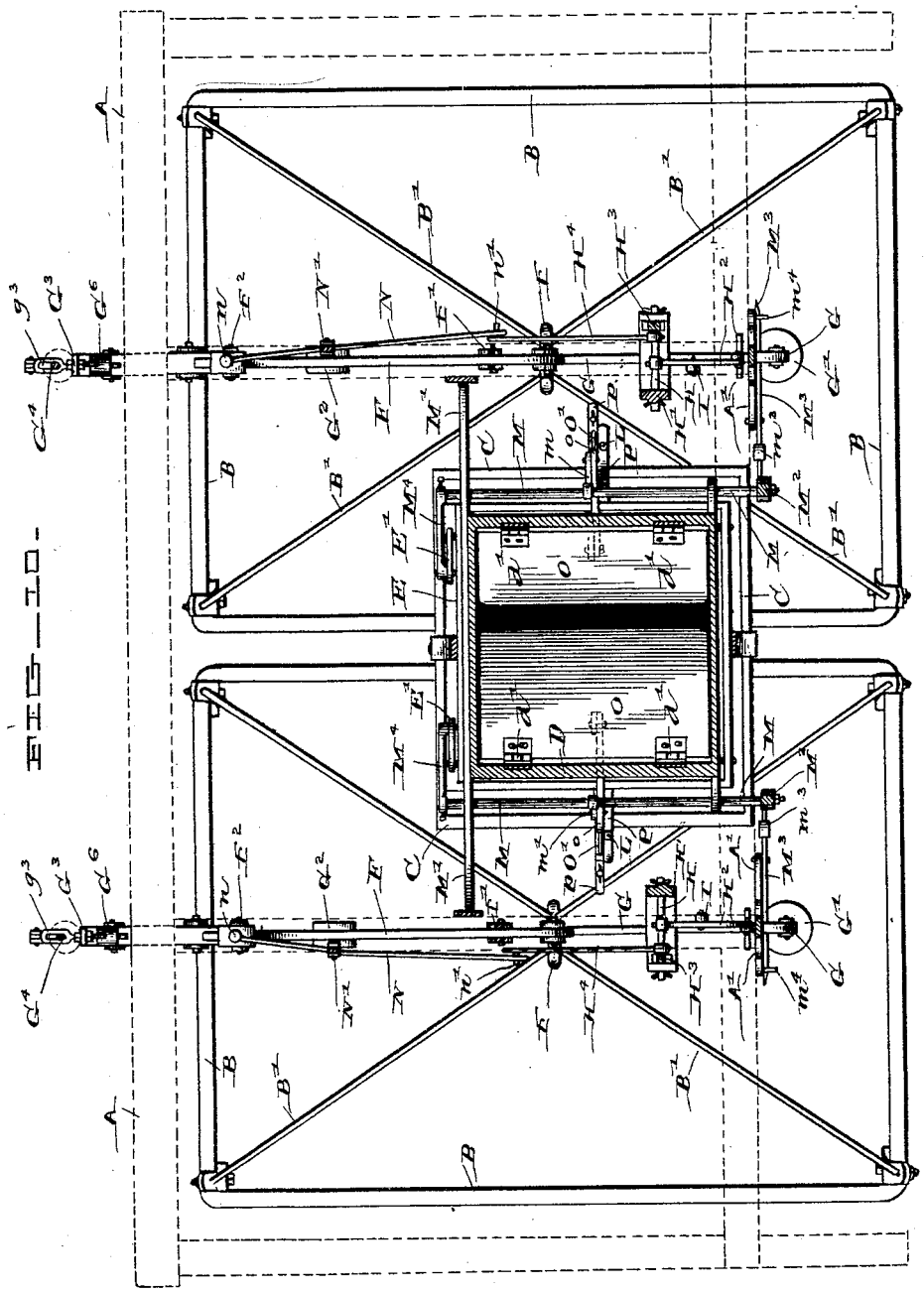

(No Model.) 4 Sheets—Sheet 1.
J. H. GUNDER & W. H. PIERCE.
AUTOMATIC GRAIN WEIGHING SCALE.
No. 452,029. Patented May 12, 1891.
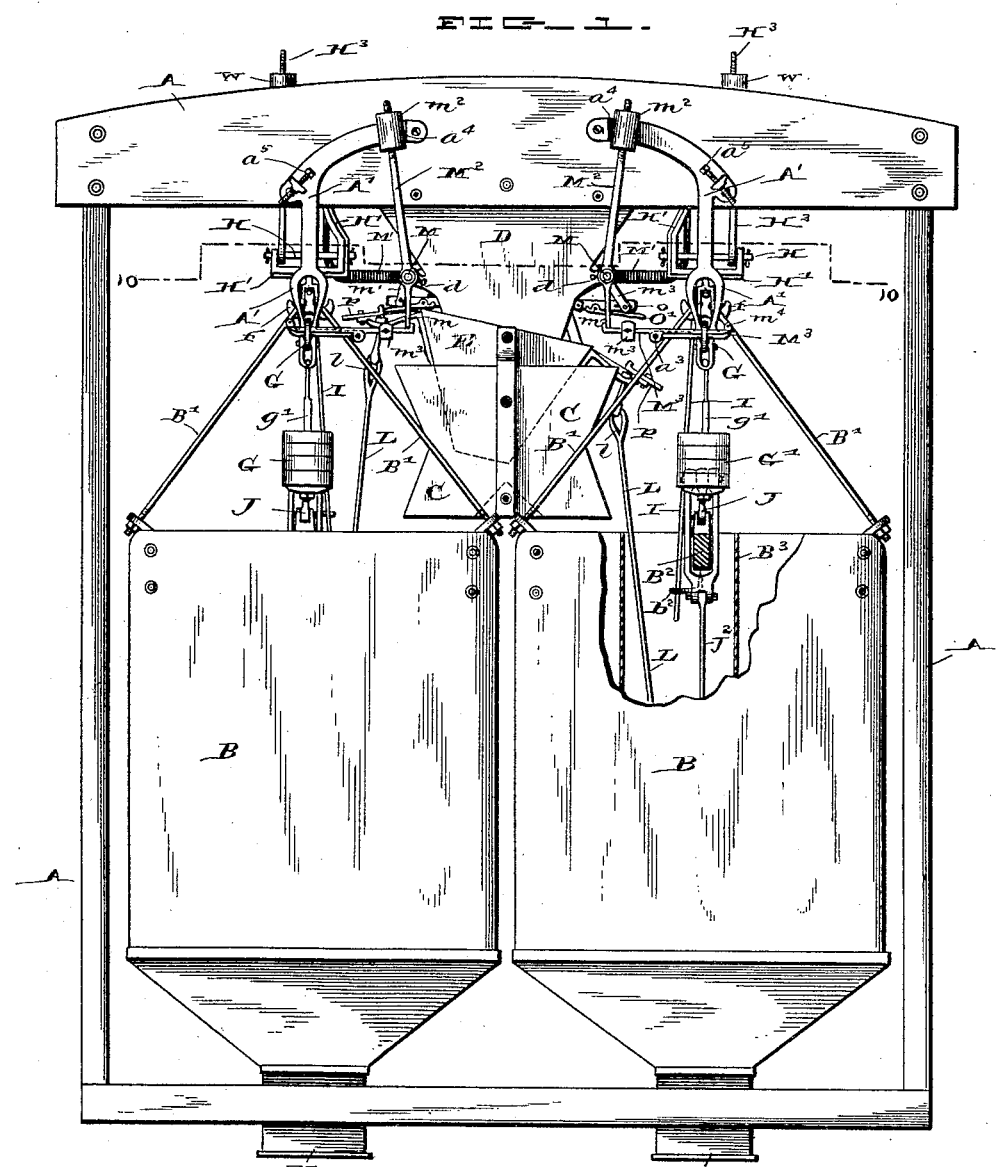
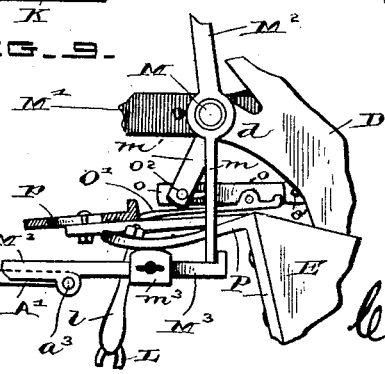
WITNESSES:
INVENTORS
James H. Gunder and
William H. Pierce,
BY
C. & E. W. Bradford,
ATTORNEYS.

(No Model.) 4 Sheets—Sheet 2.
J. H. GUNDER & W. H. PIERCE.
AUTOMATIC GRAIN WEIGHING SCALE.
No. 452,029. Patented May 12, 1891.
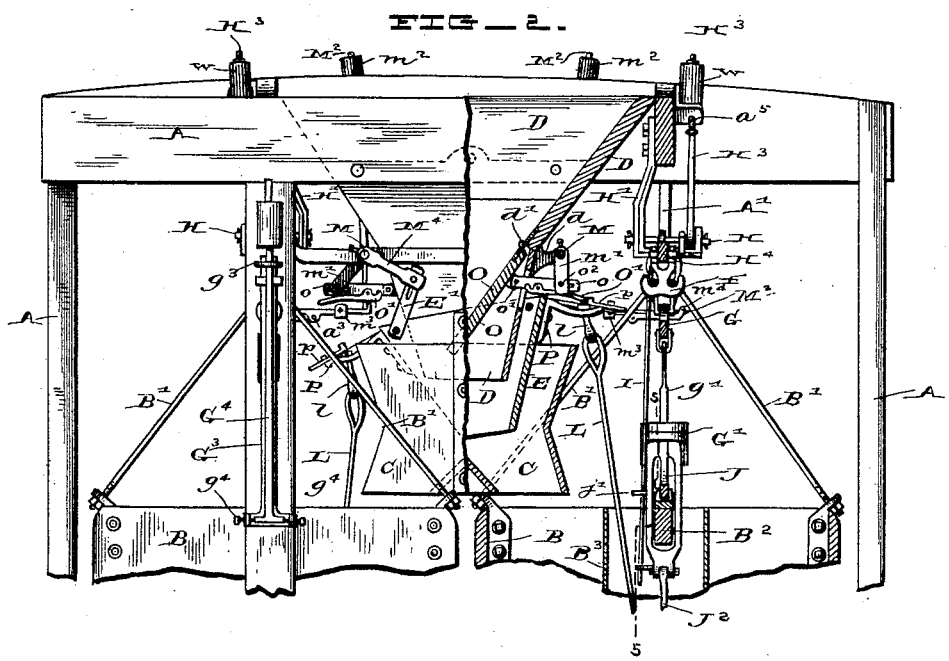
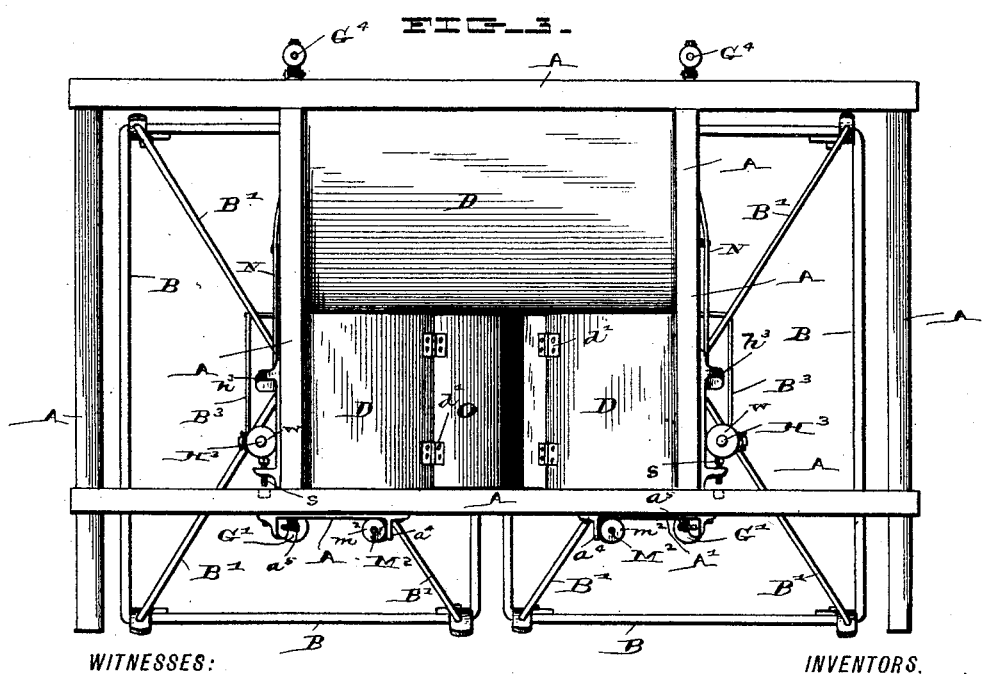
WITNESSES:
H. D. Nealy
F. H. Hood
INVENTORS.
James H. Gunder and
William H. Pierce,
BY
Cox & W. F. Bradford,
ATTORNEYS.

(No Model.) 4 Sheets—Sheet 3.
J. H. GUNDER & W. H. PIERCE.
AUTOMATIC GRAIN WEIGHING SCALE.
No. 452,029. Patented May 12, 1891.
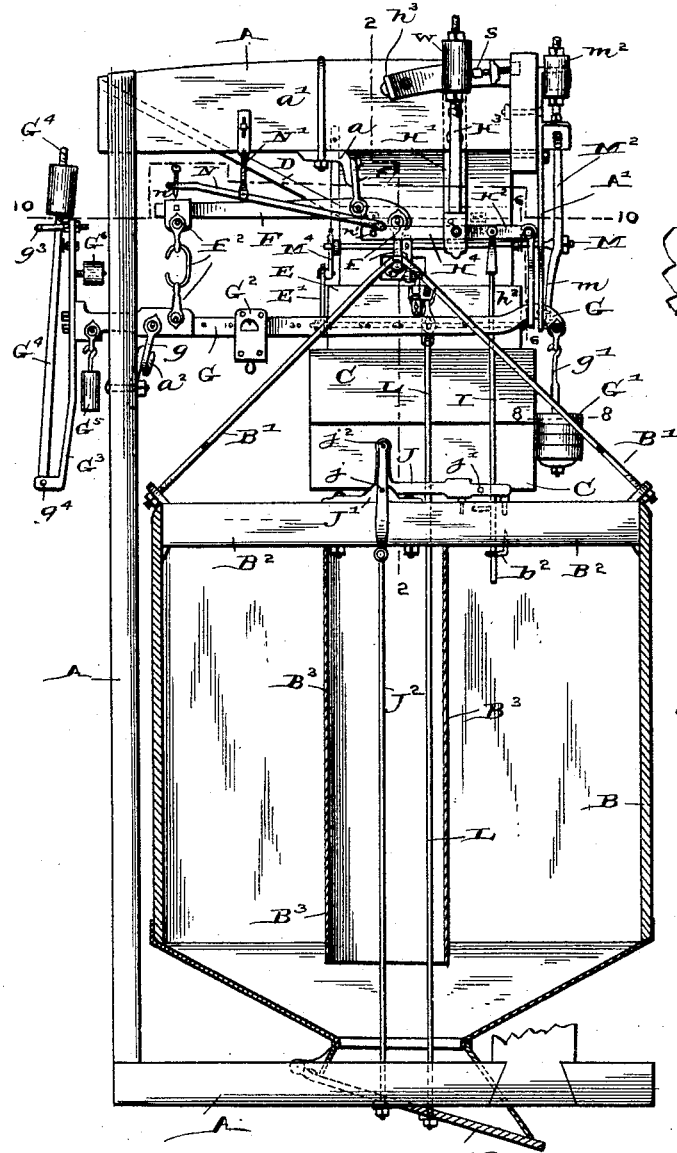
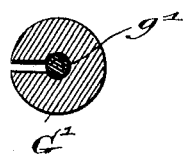
WITNESSES:
H. D. Nealy.
F. H. Wood.
INVENTORS
James H. Gunder and
William H. Pierce,
BY
Et al. W. Bradford
ATTORNEYS.

(No Model.) 4 Sheets—Sheet 4.

J. H. GUNDER & W. H. PIERCE.
AUTOMATIC GRAIN WEIGHING SCALE.

No. 452,029. Patented May 12, 1891.

WITNESSES:

INVENTORS.
James H. Gunder and
William H. Pierce
BY
C. & W. S. Bradford,
ATTORNEYS.

UNITED STATES PATENT OFFICE.

JAMES H. GUNDER AND WILLIAM H. PIERCE, OF TOLONO, ILLINOIS.

AUTOMATIC GRAIN-WEIGHING SCALES.

SPECIFICATION forming part of Letters Patent No. 452,029, dated May 12, 1891.

Application filed January 13, 1891. Serial No. 377,618. (No model.)

*To all whom it may concern:*

Be it known that we, JAMES H. GUNDER and WILLIAM H. PIERCE, citizens of the United States, residing at Tolono, in the county of Champaign and State of Illinois, have invented certain new and useful Improvements in Automatic Grain - Weighing Scales, of which the following is a specification.

Our present invention consists in certain improvements upon that for which Letters Patent of the United States No 436,854 were granted us, dated September 23, 1890, whereby the efficiency and accuracy of the apparatus are increased, as will be hereinafter more particularly described and claimed.

Referring to the accompanying drawings, which are made a part hereof, and on which similar letters of reference indicate similar parts, Figure 1 is a front elevation of a scale embodying our said invention, a portion of the wall of one of the receptacles being broken away to show some of the interior parts; Fig. 2, a view partially in rear elevation and partially in section on the dotted line 2 2 in Fig. 4; Fig. 3, a top or plan view; Fig. 4, a side elevation, the grain-receptacle being drawn in section to show the interior thereof; Fig. 5, a detail elevation looking toward the right from the dotted line 5 5 in Fig. 2; Fig. 6, a detail sectional view looking toward the right from the dotted line 6 6 in Fig. 4; Fig. 7, a detail sectional view looking toward the left from the dotted line 7 7 in Fig. 6; Fig. 8, a horizontal sectional view through the weights on the dotted line 8 8 in Fig. 4; Fig. 9, a detail elevation, on an enlarged scale, of a portion of the mechanism as shown in Fig. 1, (the catch $p$ being drawn in section to show the slot therein;) and Fig. 10, a plan view of the mechanism as seen from the dotted line 10 10 in Figs. 1 and 4.

In said drawings, the portions marked A represent the frame-work of our improved scale; B B, the two receptacles which contain the grain while being weighed; C, a double chute located below the hopper, one of the two exits of which leads to each of the two grain-receptacles; D, a feed-hopper secured to the frame-work, into which the grain is first directed when it is to be weighed by our improved apparatus; E, a pivoted hopper-shaped shifting chute located intermediate the double chute C and the feed-hopper D and adapted to be moved to discharge alternately into each of the two exits of said chute C; F F, the levers upon which the grain-receptacles B are suspended; G G, the scale-beams; H H, rock-shafts, upon which are mounted arms and weights which, through suitable connections, set off the gate-opening mechanism; I I, trip-rods supported upon arms on the rock-shafts H; J J, bell-crank levers mounted on cross-bars on the receptacles B; K K, the discharging-gates; L L, rods running from said discharging-gates to projections on the shifting chute E; M M, rock-shafts carrying mechanism for operating gates for reducing the flow of grain just previous to the shifting of the flow from one receptacle to the other; N N, levers for tripping the weights which operate said shafts and said mechanism; O O, said reducing-gates, and P P brackets to which the rods L are attached, and which also carry catches for the gate-operating mechanism on the rock-shafts M.

The frame-work A is suitably constructed and arranged to support the various hoppers, receptacles, and mechanism of the scale, and carries various hangers and bearings for said mechanism, as will be hereinafter described in connection with the description of such mechanism.

The receptacles B B are preferably of substantially the form shown and of a size suitable for the work to be done. In a grain-scale which we have actually constructed and used the receptacles are adapted to each contain seven hundred pounds of wheat and such quantities of other grains as are in proportionate relation thereto as regards weight and bulk. These receptacles are suspended by suitable bails B' to hangers $f$, which are suitably mounted on knife-edges on the inner ends of the levers F, forming part of the scale mechanism, as will be presently described. About centrally they are provided with cross bars or beams $B^2$, rigidly secured in their upper ends, upon which are the bearings for the bell-crank levers and trips therefor, by which the gates are operated, as will also be presently described. Extending down from said cross-bar $B^2$, centrally to near the bottom, is a casing or tube $B^3$, which surrounds the rods extending to the discharging-gates and which protect said rods from contact with the contents of said receptacles, except at the lower ends, where the motion is slight, and where consequently such contact will not obstruct the operation.

The double chute C is substantially of the same general construction and arrangement as that forming part of the apparatus shown in our Letters Patent above referred to. It incloses the lower portion of the shifting chute E, and it is provided with two exits which are arranged to discharge into the two receptacles B B, one into each. Said double chute C is supported rigidly from the frame-work of the apparatus and has no independent movement.

The feed-hopper D is in general outline a plain ordinary hopper, and is secured fixedly to the frame-work. Its lower end is inclosed by the upper portion of the shifting chute E, into which it discharges. Hinged to its interior are the reducing-gates O O, which are adapted to partially close its exit, as will be hereinafter more particularly described. Upon the sides of this feed-hopper D are brackets $d$, which form bearings for the shafts M.

The shifting chute E is also in itself substantially like that shown and described in our aforementioned Letters Patent. It is interposed between the feed-hopper D and the double chute C, and is arranged so as to be tilted to discharge into one or the other of the exits of said double chute, and thus shift the flow of grain alternately from one to the other in the process of continuous weighing for which our apparatus is designed. The shifting occurs simultaneously with the opening of the discharging-gates, as will be presently described.

The levers F F are also similar to those shown in our former Letters Patent, except that the form and arrangement are somewhat improved. They are suspended from the frame-work by means of links $f'$, which hang upon brackets $a$, which are in turn secured to said frame by clevises $a'$. They carry upon their inner ends the hangers $f$, by which, through the bails B′, the receptacles B are supported. At their other ends they carry the hangers $f^2$, (composed, preferably, of several parts, as shown,) which engage with the scale-beams G, and through which said levers are operated from said scale-beams.

The scale-beams G G are in many respects similar to ordinary scale-beams, being preferably provided with hanging weights G′ and a sliding weight $G^2$ in an ordinary and well-known manner. They are connected to the levers F F by the hangers $f^2$ and to the frame-work by links $g$, which engage with the brackets $a^2$, as shown, and as will be readily understood. At the rear end there is secured to the scale-beam a substantially vertical cross-bar $G^3$, preferably of considerable length. A weighted arm $G^4$ is pivoted to the lower end of this cross-bar $G^3$ by a pivot $g^4$ and extends up through a loop $g^3$ upon the upper end of the bar G′. There is also connected to the rear end of the scale a weight $G^5$, preferably in the form of a hollow vessel or tube, capable of receiving shot or some similar articles, and an adjustable ball $G^6$ is also secured to a convenient point, such as the inner side of the upper portion of the cross-bar $G^3$. The pivoted lever $G^4$, when the corresponding receptacle is being filled with grain, inclines inwardly just enough so that it shall rest against the side of the surrounding loop $g^3$ nearest the cross-bar $G^3$. When in this position and when the weights G′ are removed and the weight $G^2$ slid back to its initial position, the apparatus is exactly "in balance," ready for weighing, the ball $G^6$ being operated to achieve this result with accuracy in a similar manner as the corresponding part is manipulated in ordinary scales, an approximately accurate balancing being first secured by placing shot or such like articles in the hollow weight $G^5$. The use of the pivoted weighted arm $G^4$ is to accelerate the movement of the apparatus when by reason of the predetermined quantity of grain having entered the corresponding receptacle B the shifting is about to take place. It accomplishes this in the following manner: Being only slightly inclined, and the vertical bar on which it is mounted being of considerable length, shortly after the scale-beam has begun to rise (from the point where it has been left by the operation of the weighted latch $M^3$) the center of gravity of the weighted arm is thrown to the other side of its pivot and it falls against the outer side of the loop $g^3$, which, as will be readily understood, gives the scale-beam a sudden impetus and results in almost instantly operating the mechanism, so that the flow of grain is changed from one to the other of the receptacles with a degree of suddenness not attainable by the use of ordinary scale apparatus. This is manifestly of great importance where large quantities of grain are to be weighed, and consequently where a slight variation in each charge of grain would amount to a large quantity in the aggregate. This movement of the scale-beam being somewhat sudden at times there would be some danger that the weights would be jostled from position and eventually fall off if no provision were made to hold them in place. We have therefore made the upper portion of the hanger $g'$ for said weights of less diameter than the lower, and made the holes through the center of the weights of greater diameter than the slit which leads into them, as shown most plainly in Fig. 8. The weights are placed on the hanger by slipping the slit over the small upper portion of the hanger and sliding them down over the larger lower portion, as plainly indicated by the drawings, and by this means said weights are securely held in place.

The rock-shafts H H are arranged transversely of the scale-beams, and preferably considerably above them and just below the level of the levers F. They are mounted in brackets H', which in turn are securely bolted to the frame-work A. Each carries three arms $H^2$, $H^3$, and $H^4$. The arms $H^2$ carry the trip-rods I, which extend down to the bell-crank levers J, and are provided with arms which extend out under said bell-crank levers when said bell-crank levers are in the position in which they hold the discharging-gates shut, as will be presently more fully described. The arms $H^3$ extend up substantially vertically, and are provided with weights $w$ upon the upper ends. They are so arranged as to be substantially on a balance when the discharging-gates are shut and during the operation of charging the receptacles. When, however, the receptacle being filled has received the predetermined quantity and the rear end of the lever F begins to be raised by the weight, it will come in contact with the point $n$ on the lever N and through said lever press down on the arm $H^4$, rocking the shaft H, which throws the arm $H^3$ over its center of gravity, permitting the weight to fall from the position shown over against the stop $h^3$, which has the effect to suddenly raise the trip-rod I, throwing the bell-crank lever J over on its pivot and so releasing the discharging-gate. Said lever N and its connections will presently be more fully described. The arms $H^2$ have hangers $h^2$, the openings or loops wherein surround the ends of the scale-beams G, and these are so adjusted that when the scale-beams are returned to position they pull down (through these hangers $h^2$) on said arms $H^2$ and rock the rock-shafts H, returning the weighted arms $H^3$ to the position shown most plainly in Fig. 4 ready for another operation. Adjustable stop-screws $s$ are provided, by means of which this movement may be adjustably limited. The openings in these hangers $h^2$ are of somewhat less length than the openings in the hangers A', in which the ends of the scale-beams play, and therefore, if the weight has not been already moved through the lever N, the scale-beam in its upward course will strike somewhat violently against the upper side of this opening and insure that this operation shall result. The main use, however, of this hanger is to restore the parts to position, as above stated. It may be well to state at this point that all these parts, including the weights, are automatically thrown back to position, ready to repeat their operation by the tilting of the shifting chute. As will be observed by an examination of Fig. 1, the rods L L are connected to brackets on the opposite sides of said shifting chute, and one of said rods extends to each of the discharging-gates. It is therefore impossible that more than one of said gates should be open at one time, and, as the rods which hold said gates shut through the bell-crank levers must in their movements follow the movements of the rods L, it will be readily understood that the bell-crank levers resume their positions, (which operation is aided by weights thereon,) and thus necessarily (aided by the scale-beams, which by this time are returning to position) pull down the arms $H^2$, and thus all the parts are back into their original position ready for further operation.

The trip-rods I, as before stated, depend from the arms $H^2$. Their lower ends extend through eyes in brackets $b^2$ on the cross-bars $B^2$, (see Figs. 1, 4, and 5,) and are guided thereby. Projections $i$ extend out from these rods I at the proper points and under those portions of the bell-crank levers J which are horizontal when the discharging-gates are closed, or under small arms $j'$, which extend out from said portions, the latter being the preferable construction.

The bell-crank levers J J are mounted upon pivots $j$ in bearings J' on the cross-bars $B^2$. One member (preferably the longer) is weighted and extends out substantially parallel with said cross-bar $B^2$ when the discharging-gates are in closed position. A small projection $j'$ preferably extends out from this member, and the projection $i$ on the rod I is adapted to engage therewith. To the other members of these bell-crank levers (preferably at the extreme ends) the upper ends of rods $J^2$ are connected by pivots $j^2$, and said rods extend down to the discharging-gates, and are so connected thereto as to support them when closed. The relative arrangement of the pivots $j$ and $j^2$ is such (see Fig. 5) that the bell-crank levers are held to the position they occupy when the gates are closed partially by the weight of the gates themselves and the load of grain resting thereon, so that they are secure from accidental displacement while the receptacles are being filled. The variation from vertical relation between these pivots is, however, so slight that the power required to lift the rods I and operate the bell-crank levers is not appreciably increased.

The discharging-gates K K are hinged at one side to the lower ends of the receptacles B and serve to close the discharging-orifices of said receptacles. They are held to closed position by the bell-crank levers J through the rods $J^2$, as has been described. They operate when opened to tilt the shifting chute E from one side to the other, thus throwing the flow of grain from the one which has just been filled to the one which has been discharged. As substantially the whole weight of the charge of grain rests upon these gates, and as when the bell-crank levers are tipped said gates are not otherwise supported, abundance of power is provided to effect this operation.

The rods L L extend from the discharging-gates K to suitable brackets on the opposite sides of the shifting chute E, and said discharging-gates thus serve to operate said shifting-chute through said rods, as has just been described.

The rock-shafts M M are mounted near one end in the bearings $d$ on the hopper D and near the other end in bearings in the cross-bar M'. Upon the front ends of these shafts are rigidly mounted arms $M^2$, carrying weights $m^2$, which weights are at all times to one side of the center of gravity, defined by the vertical planes in which said shafts are situated, so that their tendency is at all times to quickly fall and rock said shafts upon being released. Said arms have continuations $m$, (which of course may be independent arms on said shafts, if desired,) which form catches whereby the arms and the weights thereon are held in their highest position, as shown most plainly in Figs. 1 and 5. These catches engage with latches $M^3$, operated by the scale-beams, as will be presently described. Centrally these shafts have arms $m'$ rigidly mounted thereon, and these are connected by the links $o$ to the reducing-gates O. Secured to the lower ends of the hangers A' by pivots $a^3$ are latches $M^3$, the inner ends of which (see Figs. 1 and 6) are adapted to engage with the lower ends of the catches $m$, and the other ends of which extend under the ends of the scale-beams G. These latches are provided with weights $m^3$, which cause their inner ends to drop when relieved of the pressure of the scale-beams, thus releasing the latches $m$ and permitting the weighted arms $M^2$ to fall, rocking the shafts M and swinging the gates O inwardly, as will be presently described. Of course, as with the other mechanism, only one of these devices operates at a time. The operation is when the grain entering the receptacles has reached about the predetermined weight—that is, as the scale-beam begins to rise it allows the end of the latch $M^3$ upon which it is has rested to rise also until said end comes in contact with the stop $m^4$, to which position it is carried by the weight $m^3$, and the other end descends sufficiently to permit the arm or catch $m$ to escape therefrom and the weighted arm $M^2$ to fall, rocking the shaft M, and through the arm $m'$ and link $o$, move the gate O. The weight $m^3$, as will be understood, starts the scale-beam on its upward course slightly before it would otherwise start, and when the other end of the latch $M^3$ reaches the stop $m^4$ there is for a short time no further movement on the part of the scale-beam. The flow of grain is thus partially cut off a short time before the complete predetermined quantity has accumulated in the grain-receptacle about to be discharged of its load. This will be more fully described in connection with the description of the gates O. Upon the rear ends of the shafts M are arms $M^4$, which extend down toward the shifting chute E, as shown most plainly in Fig. 2, and are there connected to links E', which are pivoted to said shifting chute. The purpose of this is that when said shifting chute is operated the shafts M will be rocked back in the reverse direction from that in which they are operated by the weights $m^2$, and thus said weights will be thrown back into position for a new operation. The weighted arms are limited in their movement in one direction by the stop $a^4$ and in the other by the adjustable stop-screw $a^5$. The links E' and $o$, to which the arms $M^4$ and $m'$ are respectively connected, are slotted, as shown most plainly in Fig. 2, (see also Figs. 1 and 9,) which permits the operating parts to acquire momentum before they are required to perform the actual work which they are designed to accomplish.

The levers N N are supported by hangers N', and are provided with contact-points $n$, preferably in the form of adjustable screws, with which the outer ends of the levers F are adapted to come in contact as they rise under the influence of the completed load of grain in the receptacles. The other ends of these levers N extend to just above the arms $H^4$ on the shafts H, and when they are operated by the force of the levers F force down said arms $H^4$, rocking said shaft H, tipping the weighted arms $H^3$ past the center of gravity, permitting them to fall, and in falling to operate the trip-rods I and set off the mechanism which releases the discharging-gates and permits them to open. Contact-points $n'$ are provided on the arms $H^4$ (they are shown in the form of projections or pins) for the ends of the levers N, as shown most plainly in Figs. 4 and 10. It is preferable that this means should be provided for the purpose of setting off these weights rather than to depend upon the scale-beams, for the reason that the force at the point where the levers F come in contact with the points $n$ on said levers N is many times greater than the force at the end of the scale-beam, where it comes in contact with the hanger $n^2$. Besides, it is desirable to relieve the scale-beam itself during its upward movement of as much of the work as possible, although it is quite capable of doing this work when the parts are properly adjusted.

The reducing-gates O O are secured inside the hopper D to opposite sides thereof by hinges $d'$. Links $o$ are secured thereto at points about central of their length by pins or pivots $o'$ and extend up to appropriate openings in the sides of the hopper D, which links at or near their outer ends are connected by pins or pivots $o^2$ to the arms $m'$ on the shafts M. Pivoted to the links $o$ are latches O', which are adapted to engage with catches $p$ (on the brackets P) when the shifting chute is in proper relation. By this means the swinging gates O, when operated, are securely held to operated position. If catches and latches were not provided, these gates, although easily operated by the force provided, would soon be forced back against the sides of the hopper D by the accumulation of grain in said hopper, which results from the partial cutting off of the discharging-opening of said hopper by said gates, as above described. As it is they remain to the position to which they are forced until the shifting chute E is tilted, which, as will readily be seen, pulls the catch $p$ away from the latch O' and permits the grain to force the reducing-gate O back against the side of the hopper D, leaving the discharging-orifice of said hopper of its normal size.

The brackets P P are secured to the sides of the shifting chute E. They are preferably in the form shown, each having two arms, one of which is curved somewhat, so that at the point where the corresponding point L is united thereto it shall be at substantially right angles with said rod, and has a hole through which an eyebolt $l$, forming the upper end of said rod, passes. The other arm is straight and carries the catch $p$, which is slotted and adjustable, as shown in Fig. 9. Said catch $p$ serves to support the reducing-gate O in position through the connecting parts, as has already been explained. It is adjustable in order that the said reducing-gate may be held a greater or less distance toward the opposite side of the hopper D from that to which it is hinged.

The operation of our said invention may be recapitulated as follows: The apparatus being all properly adjusted and placed so that the hopper D is under or connected with a grain-spout, the grain is turned on and allowed to run through said hopper, the shifting chute E, and one of the branches or exits of the double chute C into the corresponding grain-receptacle B. When the said receptacle is nearly filled, the first movement is that of the latch $M^3$, which is caused by its weight $m^3$ to raise the scale-beam slightly until said latch comes in contact with its stop $m^4$. The weighted arm $M^2$, being thus released, operates through its connections the corresponding gate O, which nearly shuts off the flow of grain, so that the remaining small quantity of grain necessary to fully operate the apparatus runs in very slowly, thus obviating the danger of too large an amount running through during the operation of shifting the flow from one receptacle to the other and insuring accurate weighing, which could not be done if the full flow were permitted to continue during the shifting operation. The gate is held to this position during the time until the shifting is completed by the latch O' and the catch $p$. When the predetermined charge of grain is fully completed, its weight of course raises the rear end of the lever F and the front end of the scale-beam G. As before stated, the rear end of the lever F comes in contact with the point $n$ on the lever N, so that the first operation as said lever F starts on its upward course is to throw the weighted arm $H^3$ over, which, through the rock-shaft H, arm $H^2$, and rod I, raises the bell-crank lever J somewhat, throwing its point which carries the pivot $j^2$ beyond its pivot $j$, when the weight of the grain itself in the receptacle, resting on the gate K, pulls down on the rod $J^2$ and completes the movement of the bell-crank lever J, permitting said gate K to open to the full discharging capacity designed and to remain open until the grain is discharged from the receptacle. Simultaneously with the foregoing operation the weighted arm $G^4$ is thrown over its center, which materially accelerates the movement, and should for any reason the lever N not have acted promptly enough the scale-beam is thereby caused to also come with considerable force against the upper side of the opening in the hanger $h^2$, whereby said scale-beam is also enabled to accomplish the work of throwing over the weighted arm $H^3$; but this is not anticipated to be often necessary. The downward movement of the gate K through the rod L immediately tilts the shifting-chute E, and the grain therefore forthwith begins to flow into the other receptacle. The movement of the shifting chute has released the latch O' from the catch $p$, and the gate O has therefore been permitted to fall back against the interior surface of the hopper D, leaving the discharging-opening of said hopper unobstructed. The weight of the accumulated grain in the hopper furnishes all the force necessary for this movement; but an arm $M^4$, secured rigidly upon the shaft M, and a link E', pivoted to the tilting chute E and connected to said arm, operate positively to return the shaft M and the weighted arm $M^2$ thereon to their former positions. When the scale-beam G descends onto the latch $M^3$ and raises its hooked end, the arm or catch $m$ has therefore been returned to place, and said latch engages therewith, and thus holds the shaft M and the weighted arm $M^2$ thereon to their normal positions, pending a recurrence of the operation by which they are released. At the same time, through the hanger $h^2$, it pulls down on the arm $H^2$ and rocks the shaft H and raises the weighted arm $H^3$ up to its former position, ready for another operation. As the discharging-gates K are both connected to the shifting chute E through the rods L the same movement which permits one gate to open of course closes the other. As a gate closes it operates through the rod $J^2$ to throw the bell-crank lever J back into position, which sustains said gate until it is again tripped. As will be readily understood by an examination of the drawings, while the movement of the end of the scale-beam is considerable the movement of the grain-receptacle itself is very slight. As we have constructed it the movement is in the proportion of about one to thirty-six.

Having thus fully described our said invention, what we claim as new, and desire to secure by Letters Patent, is—

1. The combination, with the grain-receptacles of an automatic grain-scale and the mechanism by which the discharging-gates of said receptacles are manipulated, of tubular structures extending down from the top of said receptacles to near the bottom, surrounding those parts of said mechanism which are immediately attached to the gate, and protecting such parts largely from contact with the grain in the receptacles, whereby said parts are enabled to operate more freely, substantially as set forth.

2. The combination, in an automatic grain-scale, of the grain-receptacles, the scale-levers, mechanism for operating the discharging-gates to the grain-receptacles, a rock-shaft or pivot H, carrying arms, one of which is weighted and another of which carries a trip-rod extending to the mechanism whereby the discharging-gates are set off, and a connection between the scale mechanism and one of said arms, whereby when the load in a grain-receptacle is completed said shaft or pivot is rocked and said weight thus started on its movement to operate said trip-rod, substantially as set forth.

3. The combination, in an automatic grain-scale, with the scale-beam thereof, of a pivoted weighted arm $G^4$, attached to the rear end of said scale-beam, said parts being relatively arranged as described, so that as the scale-beam rises said weighted arm will be thrown over the center of the sustaining-pivot and the further movement of the scale-beam thus accelerated, substantially as set forth.

4. The combination, in an automatic grain-scale, of the hopper, hinged gates within said hopper adapted to partially close the discharging-orifice of the same, rock-shafts connected by arms and links with said gates, a weighted arm on each rock-shaft, a catch extending down from an arm on said rock-shaft, and a latch normally held into engagement with said catch by the scale-beam when in the position it occupies while the load is being deposited in the grain-receptacle, which is adapted to trip and release said catch as the scale-beam begins to rise, substantially as set forth.

5. The combination, in an automatic grain-scale, of the scale-beam, a hanger through which the front end of the scale-beam passes, having an orifice which permits the necessary movement, and trip mechanism having a hanger which also surrounds the end of the scale-beam, whereby said scale-beam is enabled in descending to position to weigh another load to also pull said tripping mechanism back into operative position before coming in contact with the surface of said hanger which limits its movement, substantially as set forth.

6. The combination, in an automatic grain-scale, of the hopper D, the shifting chute E, gates hinged within said hopper, adapted to partially cut off the flow of grain therefrom, a rock-shaft M, carrying a rigidly-attached weighted arm, an arm and a link connecting said rock-shaft with said gate, and an arm and link connecting said rock-shaft with said shifting chute, whereby said shaft may be rotated through said arms and links by the movement of said shifting chute and the weighted arm restored to operative position, substantially as set forth.

7. The combination, in an automatic grain-scale, of a hopper, a gate hinged within said hopper and adapted to partially cut off the flow, mechanism for operating said gate, and a latch O' and catch $p$, whereby the same may be held in position, substantially as set forth.

8. The combination, in an automatic grain-scale, of the feed-hopper D, having a gate hinged therein adapted to partially cut off the flow of grain, mechanism for operating the same, the shifting chute E, having a bracket thereon carrying a catch $p$, and a latch pivoted to said mechanism and adapted to engage with said catch when the side of said shifting chute carrying it is raised, but adapted to be freed therefrom when said side of said shifting chute is depressed, substantially as set forth.

9. The combination, in an automatic grain-scale, of the two grain-receptacles, a double chute, a hopper, a shifting chute intermediate said double chute and said hopper, gates hinged within said hopper and adapted to partially cut off the flow of grain, and mechanism whereby said gates are operated just previous to the tilting of said shifting chute and released upon the tilting of said shifting chute, whereby during the shifting of the flow of grain said flow is materially reduced, substantially as set forth.

10. The combination, in an automatic grain-scale, of the grain-receptacles, the discharging-gates thereto, levers upon which said grain-receptacles are hung, a tripping mechanism for releasing said discharging-gates, and a pivoted lever, one end whereof engages with said tripping mechanism and the other end of which extends out over the lever to which the receptacle is suspended, whereby when said lever is operated by the weight of the grain in said receptacle it will automatically set off said tripping mechanism and open said discharging-gate, substantially as set forth.

11. The combination, in an automatic grain-scale, of the hopper D, hinged gates arranged within said hopper and adapted to partially cut off the flow of grain, a rock-shaft M, connected by an arm and link with said gate, a weight on an arm on said rock-shaft, whereby it may be rocked to operate said gate, and a pin-and-slot connection between said arm and said link, whereby said weight is enabled to acquire considerable momentum before being required to do its work, substantially as set forth.

12. The combination, in an automatic grain-scale, of the hopper D, the gates therein for partially cutting off the flow of grain, the weight mechanism for operating the same, the shifting chute E, an arm on the shaft of said weight mechanism, a link connecting said arm and said chute, the connection between said arm and said chute being a pin-and-slot connection, whereby the shaft is enabled to be freely rocked without being limited by the attachment to said shifting chute when the side of said shifting chute to which it is connected is in its raised position, but whereby when said side is tilted downwardly it may rock said shaft and raise the weighted arm to the position where it is ready for another operation, substantially as set forth.

13. The combination, in an automatic grain-scale, of the discharging-gate, tripping mechanism therefor, which includes a weighted arm mounted on a pivot or rock-shaft, a connection with the scale-beams by which said tripping mechanism is operated, and a stop $h^3$ and an adjustable stop-screw $s$, whereby the movement of said weighted arm is limited, substantially as shown and described.

14. The combination, in an automatic grain-scale, of a feed-hopper, reducing-gates hinged within said hopper, a weight mechanism connected to each reducing-gate, by which it may be forced inwardly, a connection between said weight mechanism and the scale-beams, whereby said mechanism may be tripped, and a stop $a^4$ and an adjustable stop-screw $a^5$, whereby the movement of said weight mechanism is limited, substantially as set forth.

In witness whereof we have hereunto set our hands and seals, at Tolono, Illinois, this 1st day of January, A. D. 1890.

JAMES H. GUNDER. [L. S.]
  WILLIAM H. PIERCE. [L. S.]

Witnesses:
 J. W. LAUGHLIN,
 GEORGE BROWNFIELD.